US007383532B2

(12) United States Patent
Asbury

(10) Patent No.: US 7,383,532 B2

(45) Date of Patent: Jun. 3, 2008

(54) SYSTEM AND METHOD FOR CLIENT-SIDE LOCALE SPECIFIC NUMERIC FORMAT HANDLING IN A WEB ENVIRONMENT

(75) Inventor: Mark Asbury, Houston, TX (US)

(73) Assignee: Computer Associates Think, Inc., Islandia, NY (US)

(*) Notice: Subject to any disclaimer, the term of this patent is extended or adjusted under 35 U.S.C. 154(b) by 740 days.

(21) Appl. No.: 10/418,361

(22) Filed: Apr. 18, 2003

(65) Prior Publication Data

US 2004/0068691 A1 Apr. 8, 2004

Related U.S. Application Data

(60) Provisional application No. 60/373,772, filed on Apr. 19, 2002.

(51) Int. Cl.
*G06F 9/44* (2006.01)

(52) U.S. Cl. ........................ 717/115; 717/137; 717/139

(58) Field of Classification Search ................ 715/213, 715/217, 236, 239, 249
See application file for complete search history.

(56) References Cited

U.S. PATENT DOCUMENTS

| | | | | |
|---|---|---|---|---|
| 6,073,090 | A * | 6/2000 | Fortune et al. | 704/8 |
| 6,122,657 | A | 9/2000 | Hoffman, Jr. et al. | |
| 6,189,137 | B1 | 2/2001 | Hoffman | |
| 6,205,480 | B1 | 3/2001 | Broadhurst et al. | |
| 6,209,007 | B1 | 3/2001 | Kelley et al. | |
| 6,266,681 | B1 | 7/2001 | Guthrie | |
| 6,822,586 | B2 * | 11/2004 | Esbensen | 341/50 |
| 6,988,241 | B1 * | 1/2006 | Guttman et al. | 715/503 |
| 2002/0062475 | A1 * | 5/2002 | Iborra et al. | 717/108 |
| 2003/0106040 | A1 * | 6/2003 | Rubin et al. | 717/106 |
| 2004/0148588 | A1 * | 7/2004 | Sadiq | 717/109 |

OTHER PUBLICATIONS

Michael Moncur, Sams Teach Yourself JavaScript in 24 Hours, Second Edition, Oct. 2000, Sams Publishing, ISBN 0-672-32025-8, pp. 76-77, 133, and 350.*

Detemmerman, V, "JavaScript functions for localized number formatting and parsing", Internet Document, 'Online!, May 1, 2001.

Plungjan M et al., "Q6 How do you display the .00, or in the case of 50 cents display .50 instead of .5?", IRT.ORG Knowledge Base, 'Online!, Dec. 3, 2001.

"Rogue Wave Standard C++ Library—Internationalization", Digital C++ Version 6.0 Documentation, 'Online!, Dec. 1997.

(Continued)

*Primary Examiner*—Tuan Dam
*Assistant Examiner*—Andrew Chou
(74) *Attorney, Agent, or Firm*—Baker Botts L.L.P.

(57) ABSTRACT

A system and method permits client-side locale specific numeric format handling in a web environment for software applications supported by programming languages. The system and method enable a software application supported by the programming language to perform client-side calculations on locale or user specific numeric data and display the numeric results in a format that is sensitive to the user's locale or specific needs. The system and method remove a locale specific or other numeric format for performing numeric calculations using the programming language and format the numeric data into one or more locale or user specific numeric formats for display.

35 Claims, 4 Drawing Sheets

ACCEPT NUMERIC DATA FROM USER — 100

REMOVE SPECIFIED NUMERIC FORMATTING FROM NUMERIC DATA — 110

PERFORM CALCULATIONS ON NUMERIC DATA — 120

APPLY SPECIFIED NUMERIC FORMATTINGTO VALUES — 130

PRESENT FORMATTED NUMERIC DATA TO USER — 140

OTHER PUBLICATIONS

"ColdFusion Markup Language Reference", Macromedia Coldfusion 5 Documentation, 'Online!, No. ZCF50MREF, Jun. 11, 2001, pp. 434-435, 515-538, 587-588.

"Release Notes for Digital Unix Systems", Digital C++ Version 6.0 Documentation, 'Online!, Dec. 1997.

"Macromedia Coldfusion Server 5 Now Available", Macromedia Press Releases, 'Online!, Jun. 11, 2001.

* cited by examiner

IS VALUE GREATER THAN 999.99
300
YES
NO
GROUPING SEPARATOR NEEDED
310
LOCATE DECIMAL SEPARATOR
320
REPLACE SEPARATOR WITH LOCALE SEPARATOR
330
CREATE TWO SUBSTRINGS
340
CONCATENATE THE TWO SUBSTRINGS
350
LOCATE DECIMAL SEPARATOR
360
REPLACE SEPARATOR WITH LOCALE SEPARATOR
370
RETURN WITH LOCALE FORMATTING
380

404
402
WEB SERVER
SCRIPT/ APPL.
BACK-END APPL.
410
408
STATIC HTML PAGES
DATABASE
DIRECTORY
DATABASE
404
402
WEB SERVER
SCRIPT/ APPL.
408
STATIC HTML PAGES
412
EXTERNAL APPLICATION
WORKSTATION
BROWSER
406
400
WORKSTATION
BROWSER
406
400
WORKSTATION
BROWSER
406
400

SYSTEM AND METHOD FOR CLIENT-SIDE LOCALE SPECIFIC NUMERIC FORMAT HANDLING IN A WEB ENVIRONMENT

CROSS-REFERENCE TO RELATED APPLICATIONS

This application is based upon provisional application No. 60/373,772, filed on Apr. 19, 2002, the entire contents of which are incorporated herein by reference.

BACKGROUND

1. Field

The present disclosure generally relates to web development and, more specifically, relates to systems and methods for processing locale specific numeric formatting in web browsers.

2. Description of the Related Art JavaScript™ is a scripting language which supports software applications on a variety of computer and computing devices regardless of the underlying operating system. The language has particular application in web documents, (e.g., Hypertext Markup Language (HTML) coded web pages) for processing or manipulating data in a web browser without invoking the web server. Such data manipulation is customarily referred to as client-side data manipulation. Currently, JavaScript™ is one of the most widely used scripting languages.

JavaScript™ technology, however, is deficient in handling and processing alternative numeric data formats which may be locale specific, i.e., numeric data formats which vary depending on the location of the client/user, and which contain characters not recognizable by JavaScript™. For example, in the United States, the number "one thousand five hundred forty-two and fifty-three cents" is customarily expressed and formatted by the client/user as "1,542.53". In Germany, the same number is formatted as "1.542,53". Regardless of the locale formatting utilized, JavaScript™ can only process this number when expressed as 1542.53.

Accordingly, software applications supported by JavaScript™ may be incapable of properly performing numeric calculations with numbers entered by the client/user using customary formatting symbols associated with the user locale. If a user in the United States types a number into a form on a web site with the comma grouping separator discussed above, JavaScript™ will not recognize the number as valid without additional manipulation of the data. Similarly, the period grouping separator methodology utilized in Germany is also unrecognizable by JavaScript™. Thus, in order for software applications supported by JavaScript™ to acquire universal and international applicability, it is necessary that these software applications handle and display numbers sensitive to the locale of the user.

Therefore, it is desirable to provide a system and method for client-side locale or user specific numeric format handling in a web environment, specifically, in a web browser. It may also be desirable to provide systems and methods for removing a locale or user specific numeric format for performing numeric calculations using JavaScript™ and then formatting the numeric data into one or more locale or user specific numeric formats for display purposes.

SUMMARY

The present disclosure provides a system and method for processing client-side user specific numeric formatting in a web environment for software applications supported by JavaScript™. In one embodiment, the present disclosure enables software applications supported by JavaScript™ to perform client-side calculations on locale specific numeric data, and then display the numeric results in a format sensitive to the user's locale or needs.

BRIEF DESCRIPTION OF THE DRAWINGS

Preferred embodiments of the present disclosure are described hereinbelow with reference to the drawings wherein.

DETAILED DESCRIPTION

Figure 1:
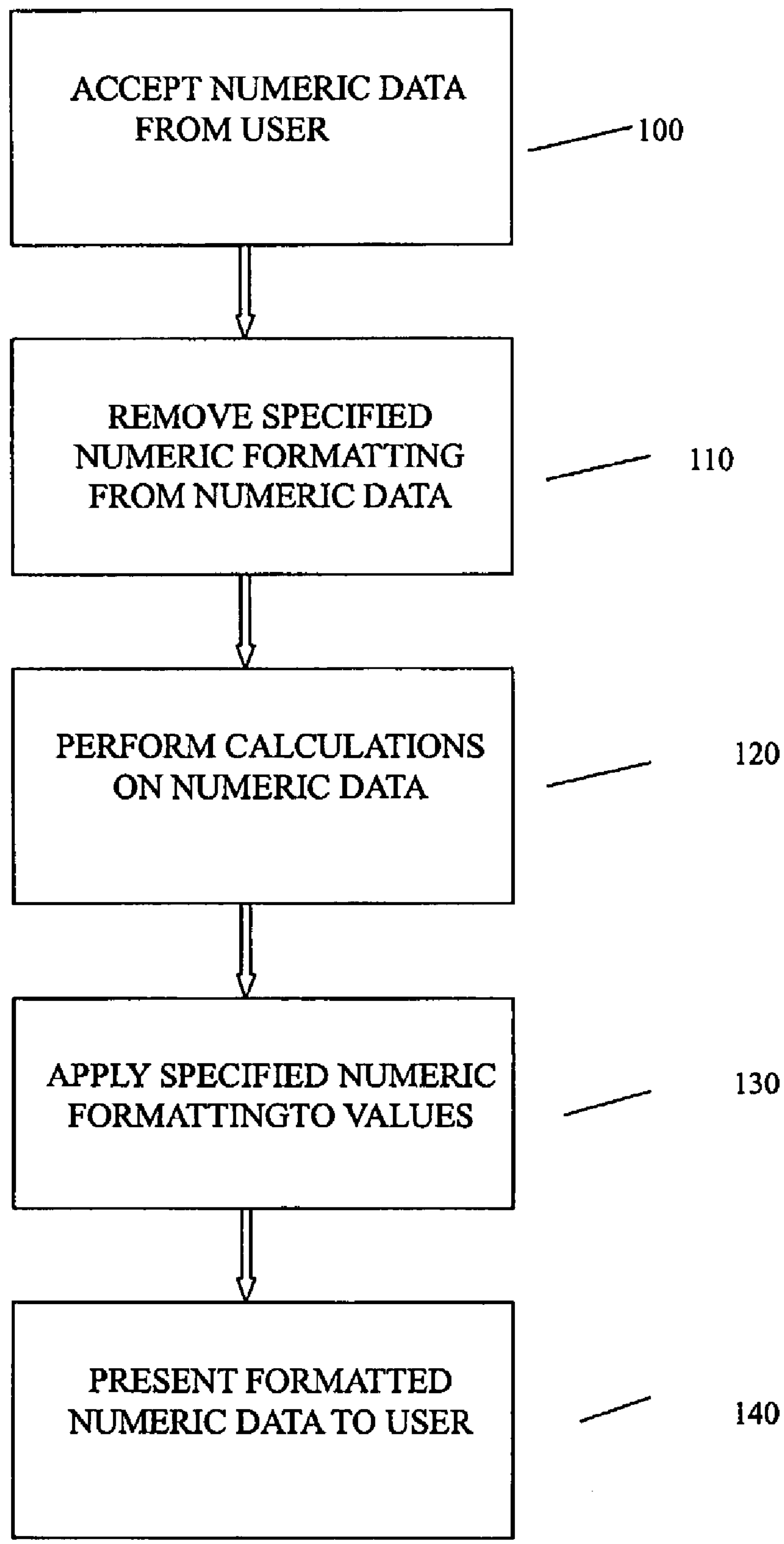
FIG. 1 is an operational flow block diagram of one embodiment of a system and method in accordance with the principles of the present disclosure.

Referring now to the drawings which are presented for the purpose of illustrating one or more embodiments of the present disclosure and not for the purpose of limiting the scope of the disclosure in any manner, FIG. 1 illustrates an operational flow block diagram of an exemplary system methodology for client-side locale specific numeric format handling in a web environment. In one embodiment, the methodology incorporates two processes or steps, e.g., a Remove Format process or function to remove any locale specific formatting from the data, and an Apply Format process or function to apply a desired format to the manipulated data for presentation. The processes can be scripts or code in the JavaScript™ language.

With reference to FIG. 1, the system operates as follows: Numeric data such as currency data is inputted by a user (Block 100). This data is typically entered in a web document in a format specific to the inputting users locale, e.g., in the comma grouping separator format customary in the U.S., or a decimal separator format customary in the various European countries. Thereafter, the locale specific numeric data formatting is removed through the Remove Format process to produce numeric data recognizable by JavaScript™ (Block 110). A software application supported by JavaScript™ then performs calculations with the unformatted numeric data (Block 120). Once the calculations have been performed, the numeric data is formatted to one or more locale specific formats (e.g., in the customary format of a reader's locale) and/or one or more user-defined formats through the Apply Format process (Block 130). The formatted numeric data is then displayed in the desired format (Block 140).

Utilization of the Remove Format and Apply Format functions provides web developers the ability to supply web applications which are sensitive to each users' locales and/or sensitive to each users' specific requests. The Remove Format and Apply Format functions will now be discussed in detail.

Remove Format Function

Figure 2:
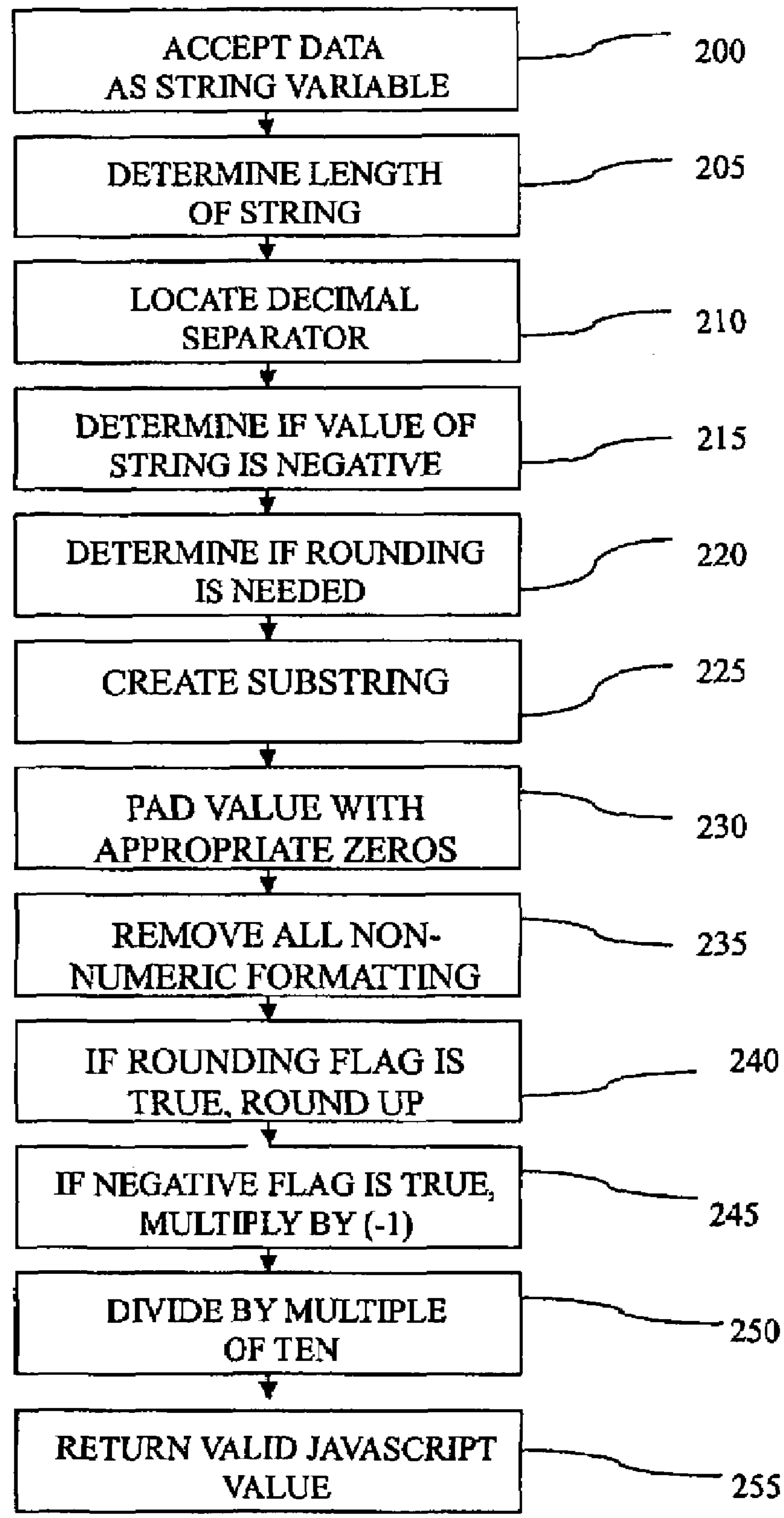
FIG. 2 is an operational flow block diagram of a Remove Format function according to one embodiment of the system and method of FIG. 1.

With reference now to FIG. 2, the Remove Format function is adapted to remove specified numeric formatting (entered by the user inputting the numeric information) to convert the formatted number into a valid JavaScript™ number. The Remove Format function removes invalid or non-numeric characters from the user-inputted data and assign a valid JavaScript™ number for each user-inputted number. The removal of the formatting for the inputted numeric data is based on the specified expected decimal separator of the locale and can be determined by the web designer or developer. The input parameters for this function are as follows:

1. Original formatted number; and
2. Locale (or user) specified decimal separator (e.g., "." in U.S., or "," in Europe).

An exemplary Remove Format function will now be described, using the formatted number "−3,456.9876" (where the decimal separator is a "."). The desired decimal designation is to the hundredths as in typical U.S. currency designations:

1. Accept the original formatted number as a string variable representative of numerical data entered by the user. (Block 200)
2. Determine the length of the string using a known JavaScript™ string method, Length( ). (Block 205)
3. Locate the position of the decimal separator within the string using the JavaScript™ string method, LastIndexOf( ) (Block 210). The position in this example number is 6.
4. Determine if the first character (position zero) of the string contains a negative symbol ("−") to ascertain if the number inputted by the user is a negative number. If the first character contains a negative symbol, set the negative flag to true, else set the negative flag to false (Block 215). For this example, the, negative flag is set to true.
5. If the formatted number contains more than two characters after the decimal separator, determine if the number needs to be rounded to the next highest number or the next lowest number. In this regard, if the third character after the decimal separator is greater than four, then set the rounding flag to true, else set the rounding flag to false (Block 220). For this example, the third character after the decimal is 7 and this number is greater than four, so the rounding flag will be set to true.
6. A substring of the string is created including all characters from the zero position though three positions after the decimal separator (i.e., to include two characters after the decimal separator). For this example, the substring becomes −3,456.98. (Block 225)
7. If the decimal separator was not found or there were less than two characters after the decimal separator, then add the necessary amount of zeros onto the end of the formatted number. If there are no characters after the decimal separator or the decimal separator does not exist, add "00" onto the end of the formatted number string. If there is only one character after the decimal separator, add "0" to the end of the formatted number string. If the decimal separator exists and there are more than two characters after the decimal separator, then do nothing. (Block 230) In this example, there were more than two characters after the decimal separator, therefore nothing will be done.
8. Use the JavaScript™ regular expression method, Replace( ), to remove all non-numeric characters from the formatted number string by replacing them with an empty string or null (Block 235). In this example, the negative symbol, grouping separator "," and the decimal separator "." will each be replaced by nulls.
9. If the rounding flag is true, then treat the formatted number as a floating-point number instead of a string, and add one to the floating-point number (Block 240). In the example above, since the rounding flag is true, the formatted number will be treated as a floating-point number, and one will be added to the number. (e.g., 345698+1=345699)
10. If the negative flag is set to true (as in the example above), multiply the floating-point number by −1 (Block 245) (e.g., 345699*(−1)=−345699.
11. Divide the floating point number by the desired multiple of ten, e.g., 100, to place the valid JavaScript™ decimal separator back into the number (Block 250) (e.g.,−345699/100+=−3456.99)
12. Return the valid JavaScript™ value corresponding to the formatted number (Block 255). For the example above, the return JavaScript™ value will be: "−3456.99".

The return value of the Remove Format method is now a valid JavaScript™ number, enabling the software application supported by JavaScript™ to perform the desired numeric calculations. As appreciated, this methodology can be performed with the comma "," as the decimal separator in lieu of the period "." separator. Similarly, the desired designation could be set to any numeric designation, e.g., to the one-thousands. In this regard, the methodology would look to a fourth character after the decimal separator for rounding (Block 220) and would divide the floating point number by 1000 (Block 250)

Apply Format Function

Figure 3:
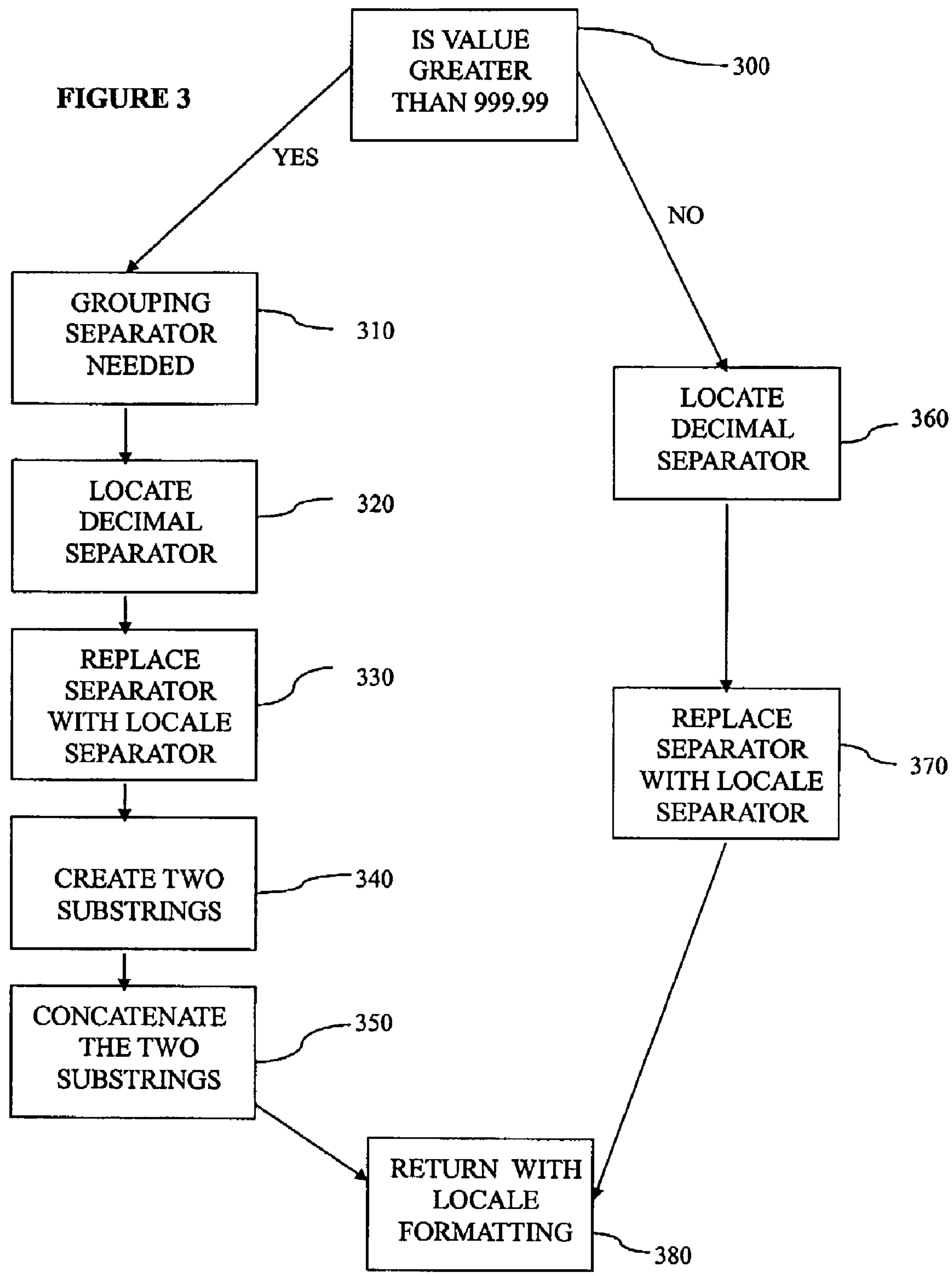
FIG. 3 is an operational flow block diagram of an Apply Format function according to one embodiment of the system and method of FIG. 1.

With reference now to FIG. 3, the Apply Format function will be discussed. As indicated above, the Apply Format function is used to apply specified numeric formatting by converting the valid JavaScript™ number into a locale and/or user specific number. This method or function returns a locale (or user) specific number as a string. The input parameters for this function are as follows:

1. Valid JavaScript™ value or number;
2. Locale (or user) specified decimal separator; and
3. Locale (or user) specified grouping separator (e.g., "," in U.S. or "." In Europe).

The methodology for this function will now be presented. For exemplary purposes, the valid JavaScript™ number "−3456.99" formatted in the Remove Format process described above will be used. The selected grouping separator will be "," and the decimal separator will be "." for the example (U.S. format). The methodology is as follows:

1. Determine if the absolute value of the JavaScript™ number is greater than 999.99 (Block 300 in FIG. 3), If yes, the grouping separator is utilized (Block 310). If no, proceed to step number 6. (Block 360) In the instant example, the absolute value is 3456.99 which is greater than 999.99; therefore, proceed to step 2.

2. Treat the JavaScript™ number as a string and locate the JavaScript™ decimal separator (Block 320).

3. Use the JavaScript™ regular expression, Replace( ), to replace the JavaScript™ decimal separator with the locale or user specific decimal separator (Block 330).

4. Use the location of the decimal separator and count backwards three characters in the string and split the string into two sub-strings using the JavaScript™ string method, Substring( ) (Block 340). For this example, there will be the following two sub-strings: "−3" and "456.99".

5. Concatenate the first and second sub-strings with the locale or user specific grouping separator in the middle (Block 350). For this example, the concatenate process will be "−3"+","+"456.99". After concatenation, the exemplary number will be "−3,456.99".

6. If there is no grouping separator (number is less than or equal to 999.99), find location of the JavaScript™ decimal separator (Block 360) and replace the JavaScript™ decimal separator with the locale or user specific decimal separator (Block 370).

7. Return the locale or user specific formatted number as a string (Block 380). The return value for the example above is "–3,456.99".

The return value for this function is thus formatted per the grouping and the decimal separators given for the specific or user locale.

The numeric data is formatted using the Apply Format method by determining the grouping separator. It is typically up to the web developer to determine the expected decimal separator and grouping separator for the one or more locale specific formats and/or one or more user-defined formats not necessarily to the locale. It is envisioned that a user in Germany may desire to express the numeric data in the U.S. format or vice versa. Apply Format returns a string with the numeric data properly formatted as pre-specified by the decimal separator and/or grouping separator.

Figure 4:
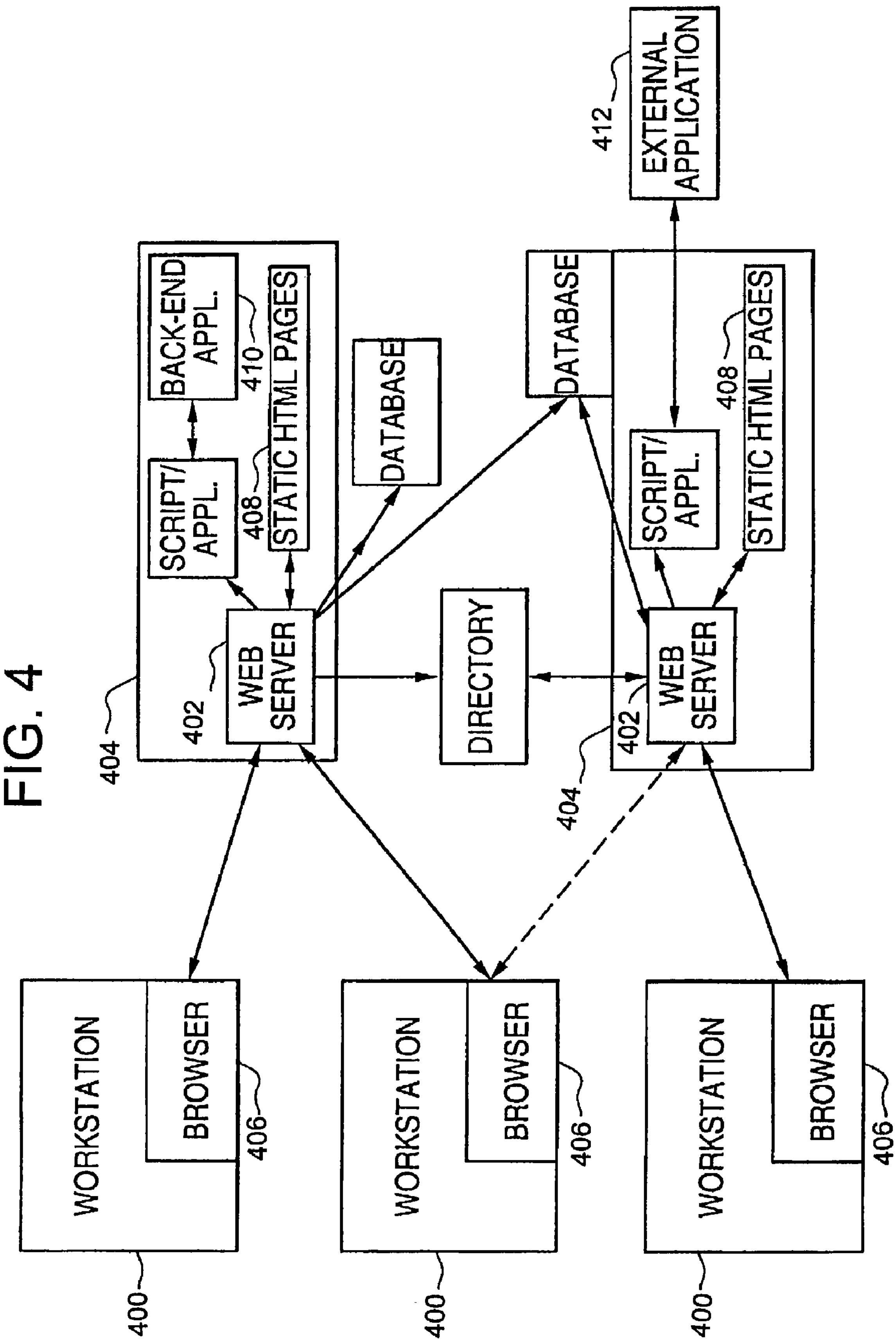
FIG. 4 is a block diagram of an intranet or internet network in which the systems and methods of the present disclosure can be implemented.

Referring now to FIG. 4, an exemplary computer network suitable for use with the method and system of the present disclosure is shown. The network includes a plurality of computer workstations 400 and a plurality of servers 402 residing on host machine 404. Each workstation 400 includes a web browser 406 which serves as a user interface to allow the user to access resources in the network. Each server 402 acts as a gateway to provide the user access to various resources, including web documents 408, back-end applications 410 (e.g., a database management system running on the same machine as the web server) and possibly external applications 412 (which run on a different machine than the web server). Each server 402 is configured to allow access by a user to the server resources.

Each user may login to the network to access computer documents relating, e.g., to particular departments of an organization, specific programs or applications, etc . . . , on one of the servers 402. For purposes of explanation, the network of FIG. 4 is part of an intranet. While the description relates to intranet environment, it will of course be appreciated that the principles of the present disclosure can be readily adapted for use in other network environments, e.g., LANs, WANs, and the internet.

Once logged in, the user accesses through the web browser a web document such as a static HTML web document for entry or review of data. The web document may request the entry of numerical data and, if so, may be coded with the aforementioned Remove Format and Apply Format methodologies to permit data manipulation independent of the customary locale of the user and subsequent presentation in a predetermined grouping format.

The systems and methods according to the present disclosure has particular applicability in products directed to assisting organizations in the planning, estimating, scheduling, building and reporting of software and other development projects such as the AllFusion™ Process Management Suite of Islandia, New York. The documents associated with such products typically request entry of numerical data which may be formatted in the specific locale of the user. Thus, by incorporating the systems and methods of the present disclosure into the programming of these documents, universal and international applicability of such products will be facilitated.

It is envisioned that the above Remove Format and Apply Format functions are storable on a computer-readable medium, such as a WEB HTML document, and can be configured for execution by at least one processor of a computer system for implementing the system of the present disclosure, and for performing the processes of the Remove Format and Apply Format functions, as well as performing calculations using valid JavaScript™ numbers returned by the Remove Format method.

What has been described herein is merely illustrative of the principles of the present disclosure. For example, the number format methods, i.e., the Remove Format and Apply Format functions, described above and implemented as the best mode for operating the present disclosure are for illustration purposes only. Other arrangements and methods may be implemented by those skilled in the art without departing from the scope and spirit of this disclosure.

I claim:

1. A method for processing numeric data in a computer document, comprising:

receiving data including numeric and non-numeric characters in a computer document supported by a programming language;

removing all non-numeric characters from the data to provide a number recognizable by the programming language;

performing at least one calculation with the number; and applying predetermined numeric formatting to at least one calculation result.

2. The method according to claim 1 further comprising presenting the at least one calculation result with the predetermined formatting to a user.

3. The method according to claim 2 wherein the step of applying predetermined numeric formatting includes selecting a user locale or user specified formatting methodology.

4. The method according to claim 2 wherein the document is a web document.

5. The method according to claim 4 wherein the programming language is a scripting language.

6. The method according to claim 5 wherein the scripting language is JavaScript™.

7. The method according to claim 4 further comprising retrieving the web document from a network server.

8. A method for processing numeric data, comprising:

receiving data including numeric and non-numeric characters in a software document supported by a scripting language;

accessing a script embedded in the software document, the script configured to remove all non numeric characters from a string indicative of the data and provide a numeric value representative of the data and expressed in a predetermined decimal format; and performing calculations with the numeric value.

9. The method according to claim 8 wherein the step of accessing includes utilizing instructions in the script configured to round the numeric value to a predetermined decimal designation.

10. The method according to claim 9 wherein the step of accessing includes utilizing instructions in the script to remove grouping separators and decimal separators from the string.

11. The method according to claim 9 wherein the step of accessing includes multiplying the numeric value by (–1) if it is determined that a first position of the string contained a negative symbol.

12. The method according to claim 8 wherein the scripting language is JavaScript™.

13. The method according to claim 8 wherein the step of accessing includes the step of determining the length of the string.

14. The method according to claim 13 wherein the step of determining is performed utilizing the JavaScript™ function Length( ).

15. The method according to claim 8 wherein the step of accessing includes the step of identifying the location of the decimal separator within the string.

16. The method according to claim 8 wherein the step of identifying is performed utilizing a JavaScript™ function Last IndexOf( ).

17. The method according to claim 13 wherein the step of accessing includes utilizing the JavaScript™ function Replace( ) to remove the non numeric characters from the string.

18. The method according to claim 8 further comprising expressing a calculation result in a predetermined numeric formatting according to a locale or user specified decimal separator or grouping separator.

19. A method for numeric format handling, comprising:

treating a given JavaScript™ value as a string;

replacing the decimal separator of the given JavaScript™ value with a locale or user specific decimal separator;

using the location of the locale or user specific decimal separator, counting backwards three characters in the string and splitting the string into two sub-strings if the JavaScript™ value is greater than 999.99; and concatenating the two sub-strings with a grouping separator in the middle.

20. The method according to claim 19, further comprising returning a numeric string having a locale or user specific formatted numeric value corresponding to the JavaScript™ value.

21. The method according to claim 20 wherein the step of replacing is performed using the JavaScript™ function Replace( ).

22. The method according to claim 19 wherein the step of splitting the string into two sub-strings is performed using the JavaScript™ function Substring( ).

23. A system for numeric format handling comprising:

means for receiving an input including numeric and non-numeric characters;

means for removing all non-numeric characters from the input to provide a number;

means for performing at least one calculation using the number by a programming language designed for operating among a plurality of operating systems in a web environment; and means for applying numeric formatting to at least one calculation result.

24. The system according to claim 23, further comprising means for presenting the at least one numeric formatted calculation result to a user.

25. The system according to claim 23 wherein the means for applying numeric formatting includes means for formatting the at least one calculation result according to a locale or user specified decimal separator and/or grouping separator.

26. The system according to claim 23 wherein the programming language is JavaScript™.

27. A computer-readable medium embodied with executable instructions stored thereon for performing numeric format handling, which comprises:

program instructions for removing all non-numeric characters from a string representative of data input including numeric and non-numeric characters, to provide a number;

program instructions for performing at least one calculation with the number; and program instructions for applying numeric formatting to at least one calculation result.

28. The computer-readable medium embodied with executable instructions stored thereon according to claim 27, further including program instructions for presenting the at least one numeric formatted calculation result to a user.

29. The computer-readable medium embodied with executable instructions stored thereon according to claim 28 wherein the program instructions for applying numeric formatting includes instructions for formatting the at least one calculation result according to a locale or user specified decimal separator and/or grouping separator.

30. The computer-readable medium embodied with executable instructions stored thereon according to claim 29 wherein the programming instructions include a JavaScript™ in a Hypertext Markup Language document.

31. A system for processing numeric data in a computer document, which comprised:

at least one server for managing network information; and a plurality of user devices in communication with the at least one server, each user device including a browser for obtaining information from the at least one server, the browser invoking the at least one server to cause a document to be displayed by the user device, each document having a prescribed field for receiving data including numeric and non-numeric characters in a predefined format, the document having interpreted the language providing instructions to remove all non numeric characters from the data to provide a number, perform at least one calculation using the number, and apply predetermined numeric formatting to at least one calculation result of the data for display to a user.

32. The system according to claim 31 wherein the at least one server is an intranet network server.

33. The system according to claim 31 wherein the interpreted language is JavaScript™.

34. The method according to claim 1, further comprising storing the at least one calculation result on tangible computer readable media.

35. The method according to claim 8, further comprising storing the numeric value on tangible computer readable media.

* * * * *